United States Patent
Bruns et al.

(10) Patent No.: US 8,809,452 B2
(45) Date of Patent: Aug. 19, 2014

(54) DAMAGE SELF-REPORTING POLYMER MATERIALS HAVING AT LEAST TWO PHASES

(76) Inventors: Nico Bruns, Freiburg (DE); Samuel Loercher, Muenchenbuchsee (CH)

( * ) Notice: Subject to any disclaimer, the term of this patent is extended or adjusted under 35 U.S.C. 154(b) by 0 days.

(21) Appl. No.: 13/701,521

(22) PCT Filed: May 27, 2011

(86) PCT No.: PCT/IB2011/052314
§ 371 (c)(1),
(2), (4) Date: Dec. 3, 2012

(87) PCT Pub. No.: WO2011/151763
PCT Pub. Date: Dec. 8, 2011

(65) Prior Publication Data
US 2013/0079467 A1  Mar. 28, 2013

(30) Foreign Application Priority Data
Jun. 3, 2010 (GB) .................................. 1009280.7

(51) Int. Cl.
*A61K 47/48* (2006.01)
(52) U.S. Cl.
USPC ........................................................ 525/54.1
(58) Field of Classification Search
USPC ........................................................ 525/54.1
See application file for complete search history.

(56) References Cited

U.S. PATENT DOCUMENTS 3,691,000 A * 9/1972 Kalnin ........................... 428/114
2007/0178305 A1 * 8/2007 Papazoglou .................. 428/402

FOREIGN PATENT DOCUMENTS

WO  WO 2009/018111  2/2009

OTHER PUBLICATIONS

Crenshaw, B.R., et al.; Macromolecules, 2007, p. 2400-2408.*
Reusch, W.; Virtual Text of Organic Chemistry, 2010, p. 1-13 (accessed via the Internet; URL: <http://www2.chemistry.msu.edu/faculty/reusch/virttxtjml/intro1.htm>).*
Nico Bruns et al. "Mechanical Nanosensor Based on FRET within a Thermosome: Damage-Reporting Polymeric Materials", Angew. Chem. 2009, 121, 5776-5779.
Bing Xu et al.; Surface modification of polyacrylonitrile-based carbon fiber and its interaction with imide; Applied Surface Science 253 (2006) 2695-2701.
J.W.C. Pang et al.; Bleeding composites—damage detection and self-repair using a biomimetic approach; Composites: Part A 36 (2005) 183-188.
Weijie Huang et al.; Attaching Proteins to Carbon Nanotubes via Diimide-Activated Amidation; NANO Letters, 2002 vol. 2, No. 4,311-314.

* cited by examiner

*Primary Examiner* — Robert Jones, Jr.
(74) *Attorney, Agent, or Firm* — Amirsehhi Intellectual Property Law; Ramin Amirsehhi

(57) ABSTRACT

A synthetic material (22), a sensor comprising the synthetic material (22) and a method for making the synthetic material (22) and the sensor, respectively, as well as the use of this synthetic material (22) as a construction material and/or a high performing material, especially in the areas of aeronautics, aerospace, automotive, wind turbines and sporting goods. The synthetic material (22) comprising at least two phases (2, 9) and an optical detectable component (26, 16), wherein at least one of said phases is a solid phase building a matrix (20) of the synthetic material (22), and wherein the optical detectable component (26, 16) changes its optical properties (symbol 5, 7) when its intact structure is perturbed (8/26'), said optical detectable component (26, 16) is bond to both phases (2, 9) of the synthetic material (22).

11 Claims, 6 Drawing Sheets

Fig. 1
State of the Art

Fig. 2a   Fig. 2b
State of the Art

DAMAGE SELF-REPORTING POLYMER MATERIALS HAVING AT LEAST TWO PHASES

CROSS REFERENCE TO RELATED APPLICATION

This application is a 35 U.S.C. 371 National Phase Entry Application from PCT/IB2011/052314, filed May 27, 2011, which claims the benefit of Great Britain Patent Application No. 1009280.7 filed on Jun. 3, 2010, the disclosure of which is incorporated herein in its entirety by reference.

Polymeric materials and particularly fiber-reinforced polymeric materials meanwhile serve as very important constructing materials in various fields of industries in order to reduce the weight of a product or in order to use the specific properties of these materials, which are quite precisely adjustable to the requirements of a construction component.

Moreover, the use of fiber-reinforced composites is becoming increasingly widespread, e.g., as structural materials in aircrafts, automobiles, sporting goods and everyday products. However, a lot of polymer materials and particularly polymer composite materials are intrinsic sensitive to impact loading and other types of mechanical damage. In particular, low velocity impacts, e.g., due to a dropped tool during assembly or maintenance, can cause delamination. Delamination is the separation of the matrix from the fiber. Most often, this kind of damage remains undetected, because the damage is localized in a small area and the only external sign of damage is a small indentation of the surface. However, this barely visible impact damage can cause a significant decay in the load-bearing properties of the material, especially because small scale delamination defects can widen and spread under load until macroscopic delamination and potential structural collapse occurs and a failure of the entire product.

Therefore, early detection of small scale damages can often be crucial for the application of polymeric materials and particularly of fiber-reinforced composite materials, such as carbon- and glass-fiber-reinforced plastics in the field of security relevant construction components.

Self-reporting materials, i.e., materials that report damage like micro cracks or delamination defects are a promising recent concept to monitor the integrity of load-bearing materials. These materials show the user the location of a small scale damage by an easy to detect signal, so that a component can be replaced or repaired before catastrophic failure occurs. Self-reporting materials are therefore highly desirable for various branches of industry aiming for light weight load-bearing components in their products formed of polymeric materials. More specific, polymeric materials with self-reporting properties are of high interest in the fields of aerospace, automotive, wind turbines, civil engineering and construction materials.

In "Bleeding composites—damage detection and self repair using a biomimetic approach" from Pang et al., published in Composites; Part A 36 (2005) 183-188; Elsevier; a synthetic material is reported having hollow glass fibers embedded in an epoxy resin laminate. The hollow fibers had been filled with an ultra-violet fluorescent dye in order to indicate a damage of the polymeric structure occurred by an impact resulting in a breakage of the hollow glass fiber. Furthermore hollow glass fibers had been filled with a modified epoxy resin repair agent able to restore damaged structures of the polymeric matrix.

Figure 1:
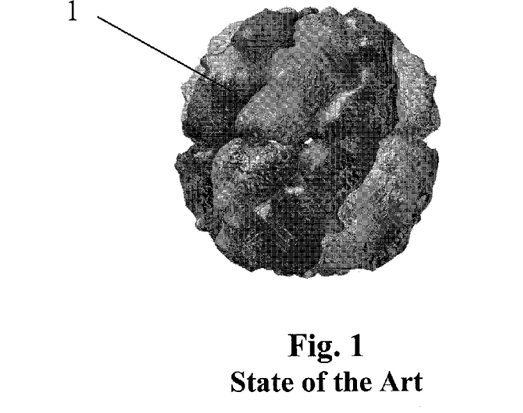
FIG. 1 a thermosome-molecule comprising fluorescent polymers as known by persons skilled in the art.
Figure 2A:
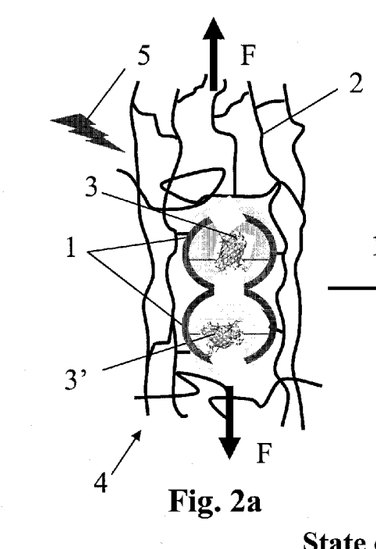
FIGS. 2a, 2b a cross-sectional view of a self-reporting polymer composite material according to state of the art comprising an optical detectable component in the form of fluorescent proteins encapsulated in the thermosome of FIG. 1.
Figure 2B:
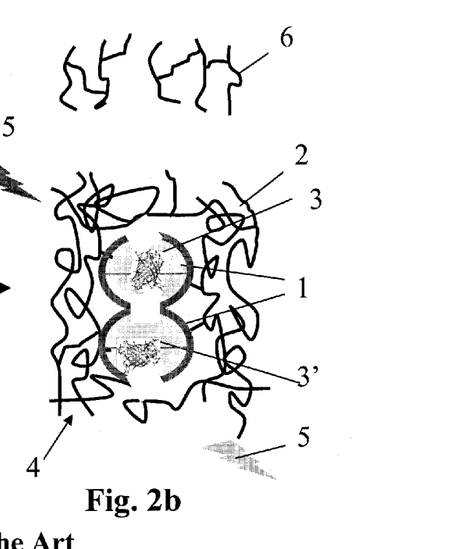

Knowing from biotechnologies about the existence of fluorescence proteins, latest developments in this field result in homogeneous polymeric materials comprising thermosome-molecules as a composite component, which serves as a support element for fluorescence proteins encapsulated therein (see: Bruns et al. "Mechanical Nanosensor Based on FRET within a Thermosome: Damage—Reporting Polymerc Materials"; Angew. Chem. 2009, 121, 5776-5779; Wiley-VCH Verlag, Weinheim 2009.). FIG. 1 shows a thermosome molecule 1 manipulated as a support element for fluorescence proteins as known by persons skilled in the art. FIGS. 2a, 2b show schematically a polymeric composite material 4 as described above having a polymeric matrix 2 and a thermosome-molecule 1 embedded in the polymeric matrix 2. The thermosome-molecule 1 encapsulates two different fluorescent proteins 3, 3' (see FIGS. 2a, 2b). FIG. 2a shows a tension force (arrows F) applied to the polymer composite material, causing reduced fluorescence resonance energy transfer (FRET) (see absence of symbol 5). The tension force then disappeared by a break down of the sample when the braking tension is passed by the applied tension force and a part 6 of the polymeric composite material 4 is separated. Without the disturbing influence of the tension force the structure of fluorescent protein 4 regenerates and the fluorescence resonance energy transfer (FRET) appears again in its entire intensity (symbol 5; FIG. 2b). However, this system is able to monitor the impact in a homogeneous polymer matrix only. The composite component within this system is the thermosome-molecule, which is needed for embedding the optical detectable component into the homogeneous polymer material.

In spite of the knowledge and experiences collected already about self-reporting polymer materials the most sensitive area in a polymer composite material structure, namely the interface between two physical phases (i.e. two solid phases within a solid material or a solid phase and a liquid phase within a solid material or a gaseous phase and a solid phase within a solid material) cannot be monitored until now. This is, although said interface is often much more sensitive to force impacts than the chain-structures of homogenous polymer materials.

The present invention provides a synthetic material, a sensor comprising that synthetic material and a method of making the synthetic material, wherein interfaces between two phases of a polymer composite material can be monitored with respect to forces, strains, compression, nano-scaled damages induced by force impacts etc., which otherwise would be not or barely detectable by conventional techniques.

The synthetic material comprises at least two phases and an optical detectable component, as mechanophore on the interface between said two phases. One phase, called the first phase, is a usually solid phase building a matrix of the synthetic material. The optical detectable component is a material that changes its optical properties when its intact structure is perturbed, said optical detectable component is bond to both phases.

In composite polymer materials having at least two phases cracks and delamination usually begin with the formation of nanometer-sized gaps between the two phases. The optical detectable component will act as a force sensor on the molecular level directly at the interface between the two phases.

The optical detectable component comprises at least one fluorescent component, particularly a fluorescent protein, which changes its fluorescence when its structure is perturbed. The absence of fluorescence in perturbed or damaged areas could than easily be detected by fluorescence microscopy or by illumination of the specimen with black light and visual inspection or by using a CCD camera equipped with a filter for noise removal.

As fluorescent components the following fluorescent proteins are suitable: enhanced blue fluorescent protein (EBFP), enhanced cyan fluorescent protein (eCFP), green fluorescent protein (GFP), enhanced green fluorescent protein (eGFP), enhanced yellow fluoresent protein (eYFP), Infrared Fluorescent Proteins (IFP).

In a special embodiment the fluorescent component is a mixture of various kinds of fluorescent proteins with different fluorescence frequencies (see list of suitable proteins above), which particularly change their fluorescence at different impact forces. The impact force causing a change of the optical properties can be determined using genetic engineering to create the adopted fluorescent proteins.

The material of both phases of the synthetic material has to be responsive to a bonding to the optical detectable component or has to be preparable in a way that it can be bond to the optical component.

The matrix material of the first phase of the synthetic material is a polymeric material, particularly a polymeric material that does not change the intact structure of the fluorescent component when it cures in connection with all other components of the synthetic material. Various polymers are suitable to build the matrix of the synthetic material. Adapted to the distinct requirements of the end product and its manufacturing process the matrix material can be one of a duroplastic material, i.e. epoxy resin (EP); unsaturated polyester resin (UP); vinyl-ester resin (VE); phenol-formaldehyde resin (PF), diallyl-phthalate resin (DAP), meth-acrylic resin (MMA), acrylic resin, poly-urethane (PUR), amino resin; particularly melamin resin (MF/MP), urea resin (UF); or one of a thermoplastc material; i.e. nylon, polyethylen (PE), polypropylen (PP), poly-vinyl-choride (PVC), particularly those thermoplastic materials having a high temperature stability; i.e. poly-ether-ether-keton (PEEK), poly-phenylene-sulfide (PPS), poly-sulfon (PSU), poly-ether-imide (PEI), poly-tetra-flour-ethen (PTFE); or one of an elastomeric material, i.e. rubber, polyurethane (PU), silicone.

The material of the second phase of the synthetic can be a liquid or a solid phase, wherein the liquid phase has preferably a high viscosity.

Beyond other components especially in construction components the most interesting second phase is a solid phase, preferably formed by a reinforcing material. The reinforcing material has preferably a fiber structure and/or a particle structure, like a spherical structure, tube structure, disc-like structure; as they can typically be found with carbon fibers and nano-particles, and/or crystalloid and/or amorphous structures, as they can typically be found with other polymers or inorganic particles like metal oxides or metal salts.

As a fiber material at least one of the following fibers is suitable as a material for the second phase in the synthetic material: inorganic fibers, like glass fibers, ceramic fibers, boron fibers, basalt fibers, silica fibers; and/or organic fibers, like aramid fibers, carbon fibers, polyester fibers, nylon fibers, acryl glass fibers; and/or metallic fibers, like aluminium fibers or steel fibers; and/or natural fibers, like wood fibers, flax fibers, hemp fibers, sisal fibers.

The second phase is dispersed in the first phase either randomly or forming a texture; i.e. caused by fibers arranged in one or more distinct directions. The latter can be achieved for example by an according extrusion process.

Having a fiber material forming the second phase, the fiber can as well be provided in form of a woven or non-woven fabric.

The bonding of the optical detectable component to both phases is realized in a way that forces induced by a movement of the two phases against each other or introduced between the two phases are taken over by the optical detectable component. The bonding is realized by physical interactions, particularly coulomb forces, hydrophobic interactions, van-der-Waals interactions, dipolar interactions, and/or by chemical interactions, particularly by a covalent bonding.

The bonding of proteins to carbon nanotubes is already known from biotechnologies (see "Huang et al.: "Attaching Proteins to Carbon Nanotubes via diimide-Activated Amidation"; Nano Lett., Vol 2. No. 4, 2002 American Chemical Society. OR: Xu et al.: "Surface modification of polyacrylonitrile-based carbon fiber and its interaction with imide"; Applied Surface Science 253, 2695-2701 (2006) Elsevier B. V.). However, there is no description of a bonding of the optical detectable component to a polymer or on an interface between two phases of a material.

When delamination occurs, fiber and matrix separate and force is applied to the proteins on the matrix-fiber interface. As the proteins are covalently bound at one or at multiple points to the fiber and to the matrix, the force will be transferred to the proteins and will most likely result in an unfolding of the biomolecules. The fluorescence will disappear in regions of delamination. The absence of fluorescence can be detected by e.g. fluorescence microscopy. In a more simplistic approach, the absence of fluorescence in damaged areas could also be detected by illumination of the specimen with black light and visual inspection.

Especially in cases, where large areas of big objects—like the wing of an aeroplane or of a wind turbine—should be analysed with respect to damages of the synthetic material they are made of, analyzing with black light and visual inspection or by a CCD camera equipped with a filter for noise removal are of advantage. The decision whether black light and visual inspection or by using the CCD Camera depends on the scale of damages which should be detectable and on the amount of optical components in the synthetic material as well as of the individual optical properties of the used optical component, i.e. the fluorescence intensity of the used protein. The smaller the scale of damages, which should be detectable and/or the smaller the intensity of the optical signal the higher the advantage of the detection method using the CCD camera with a filter for noise removal. The CCD camera has to be chosen with a lens system adapted to the area of inspection and the time of exposure has to be adapted to the intensity of the expected optical signal. The latter might be several hours, which is not a problem, because of the noise filter of the camera.

In some cases obviously only the first layer of the fibers in the polymer matrix can be analyzed by microscopy, as light will be blocked by the fibers from penetrating deep into the material. However, sufficient information about a damaged area can be collected from close-to-surface layers, especially with the sensitivity of the fluorescence process. Moreover, a special microscopic technique, two photon fluorescence microscopy, can penetrate deeper into a material, as it uses IR light to excite the fluorophores.

Preferably the synthetic material is used as a sensor comprising, particularly a force-sensor, strain sensor, and/or damage-detecting sensor, detecting impact forces and/or strains and/or damages by a change of the optical properties of the optical detectable component. In composite polymer materials having at least two phases, cracks and delamination usually begin with the formation of nanometer-sized gaps between the two phases. The optical detectable component will act as a force sensor on the molecular level directly at the interface between the two phases. Therefore, it is expected that they will report delamination before the damage becomes detectable by other techniques such as bright field microscopy.

The synthetic material can be made advantageously by a method, wherein the optical detectable component is placed and fixed at the interface between two phases of a composite material and wherein the optical detectable component is particularly at least one kind of fluorescent proteins.

This method comprising the steps of: immobilizing the optical detectable component onto a surface of fibers, particles, molecules or atoms respectively of a material forming one of the at least two phases of the synthetic material, choosing a material forming the other phase of the at least two phases of the synthetic material, which is responsive to a bonding to the optical detectable component or preparing the material forming the other phase of the at least two phases of the synthetic material, thus it can be bond to the optical component, mixing the at least two materials and curing the mixture to form the synthetic material.

Depending on the materials chosen for the two phases and particularly the polymer matrix material of the first phase, the mixed materials can be processed to a semi-finished product or product by extrusion, molding, lamination, calendering, and other usual processes known in the technical field of polymer manufacturing.

Although, there are described only synthetic materials having two phases in here the advantages of the presented invention can be achieved with synthetic materials having three different phases or more then three phases as well. For those synthetic materials in can make sense to prepare more than one phase embedded in the matrix material with optical detectable components but it might also make sense to modify only one of the embedded phases.

In order to create a sensor comprising the synthetic material the method should advantageously comprise the steps of: determining at least one amount of an impact force, a strain, a mechanical deformation, a compression, an extension, a bending, a fiber-breaking, a delamination, a matrix-cracking which should be detectable; choosing or creating an according optical detectable component, which changes its optical properties by an impact force, strain, mechanical deformation, compression, extension, bending, fiber-breaking, delamination, matrix-cracking of the determined amount or higher amount and placing the optical detectable component at an interface between two phases in a synthetic material having at least two phases.

In a preferred embodiment at least one fluorescent protein is chosen as optical detectable component. The at least one fluorescent protein changes its fluorescence by an impact force, strain, mechanical deformation, compression, extension, bending, fiber-breaking, delamination, matrix-cracking of the determined amount or a higher amount;

In a further preferred embodiment the method for manufacturing a sensor comprising the synthetic material the following steps are to be considered: determining a detection area within the synthetic material, where the detection should be executed and placing the optical detectable component fixed at the interface between the two phases at the determined detection area.

Determining the detection area is preferably done after determination of the shape of the sensor and can usually created during extrusion, molding, lamination and so on. The detection area can be the whole material or at one or more localized areas.

In a further preferred embodiment various different optical detectable components, having different detectable optical properties and changing their optical properties at different amounts of impact are used for a sensor. The optical detectable components are equally and randomly dispersed in the sensor. A sensor created like this is not only able to detect an impact passing over a threshold but is sensitive for the intensity distribution of an impact.

Further aspects of the invention are disclosed in claims 1; 10; 11; 13 and their dependent claims.

In the following the invention is explained using the schematic diagrams of the figures. Equal components are indicated with identical indices. The schematic diagrams of the figures serve as examples only and neither the description given herein nor the figures should have any restriction with respect to the inventive idea as given in the claims.

Figure 3A:
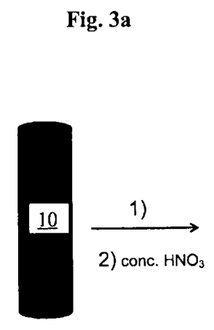
FIGS. 3a, 3b, 3c a surface activation process of a carbon fiber.
Figure 3B:
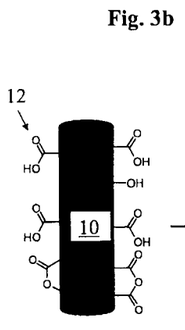
Figure 3C:
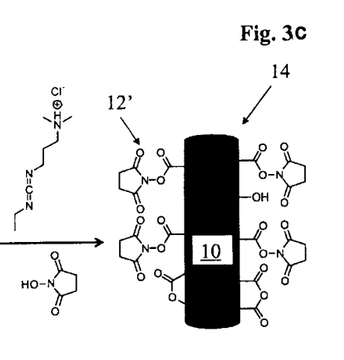

FIGS. 3a, 3b, 3c show the preparation process of a carbon fiber 10, comprising step 1) purification of a common carbon fiber (FIG. 3a), i.e. using acetone and step 2) preparing the surface of the fiber 10 for the bonding reaction, using concentrated HNO3. This process generates functional groups 12, like carboxylic acid functional groups, next to others, on the surface of the carbon fiber 10 (FIG. 3b). In a further step the fiber surface has been activated via NHS-ester activated amidation, which results in a herein so called prepared fiber 14 comprising functional groups 12' at the surface of the carbon fiber 10 (FIG. 3c).

Figure 4A:
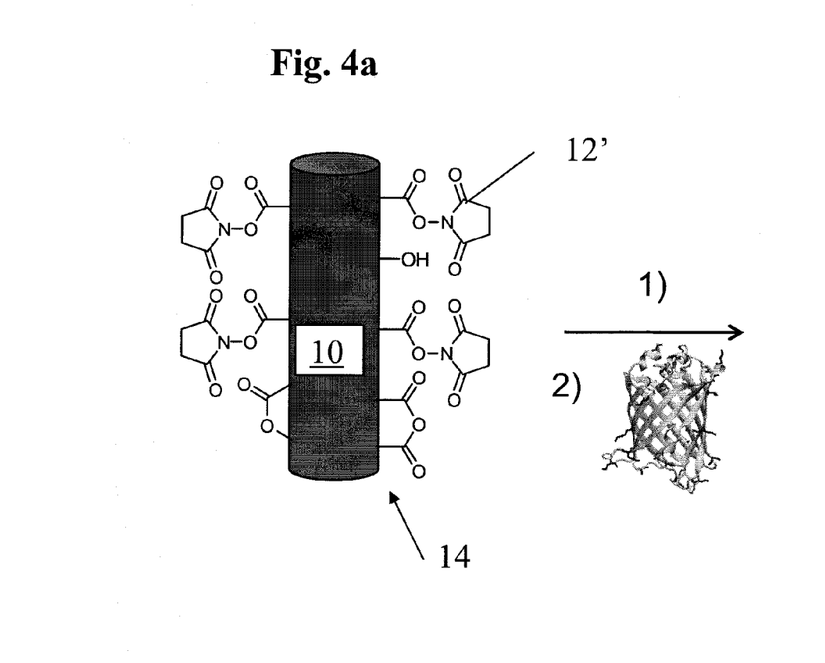
FIGS. 4a, 4b a connecting reaction bonding fluorescent proteins onto the surface of the prepared carbon fibers of FIG. 3c.
Figure 4B:
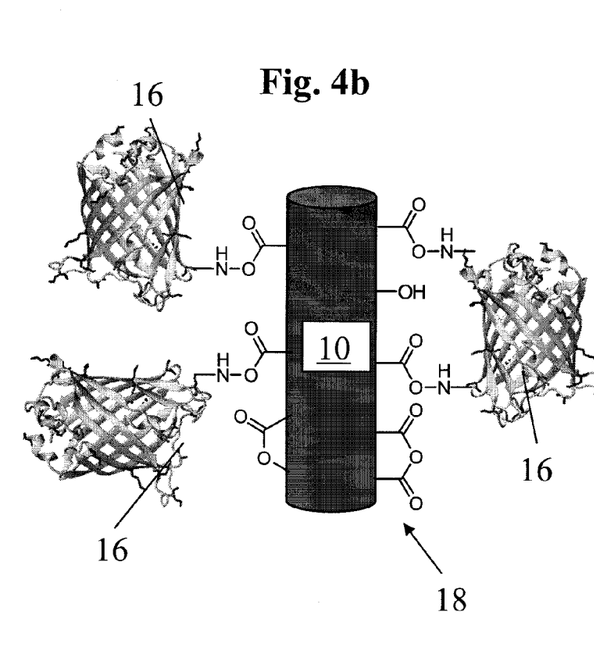

FIGS. 4a, 4b show the connecting reaction bonding fluorescent proteins 16 onto the surface of the prepared carbon fibers 14 (FIG. 4a) in order to create a herein so called modified carbon fiber 18 (FIG. 4b) having an optical detectable component 26, 16 bonded to its surface. To this end, enhanced yellow fluorescent protein (eYFP), or enhanced cyan fluorescent protein (eCFP) are immobilized on the fibers' surface, indicated by index 2) at the reaction arrow. In order to do so, the prepared carbon fibers 14 are exposed to 1-ethyl-3-(3-dimethylaminopropyl)-carbodiimid and N-hydroxysuccinimide (NHS) in a 2-(N-morpholino)-ethanesulfonic acid (MES) solution containing NaCL and buffered to pH 6.0, indicated by index 1) at the reaction arrow.

Figure 5A:
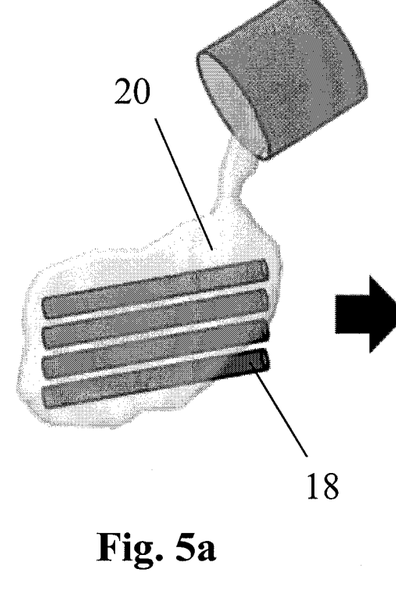
FIGS. 5a, 5b schematically the embedding process or mixing process, respectively of the materials of the at least two phases of a synthetic material.
Figure 5B:
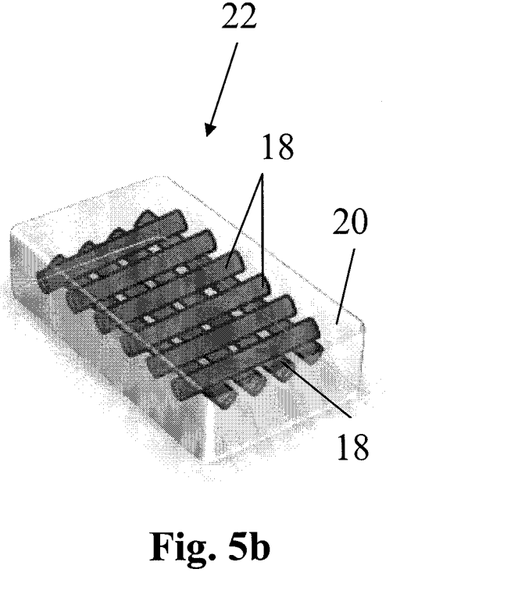

FIGS. 5a, 5b demonstrate schematically the embedding process of the modified carbon fibers 18 within a polymer matrix 20, in order to build a synthetic material 22 according to the invention (FIG. 5b). One example for this process is the mixture of a two-component epoxy resin according to the manufacturers protocol and the lamination of fluorescent protein-enhanced single carbon fibers or fiber fabrics with the epoxy resin/hardener mix and curing the mixture at room temperature for about 2 h.

Figure 6:
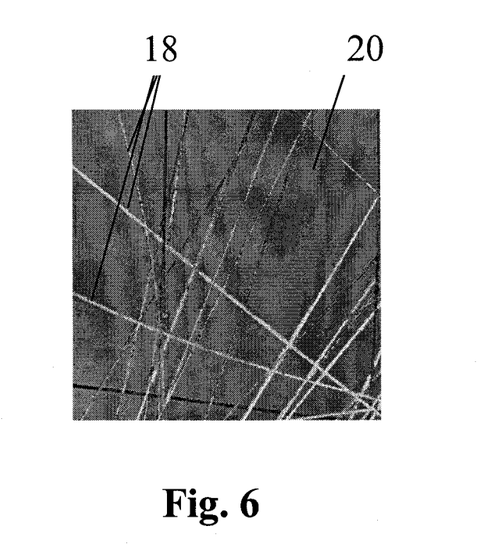
FIG. 6 a sample of a synthetic material comprising a transparent polymer matrix with randomly dispersed modified fibers within the matrix.

FIG. 6 shows a sample having a transparent polymer matrix 20 of an epoxy-resin, i.e. Araldit Cristal® or UHU® plus kristall with randomly dispersed modified carbon fibers 18. The carbon fibers 18 had been modified in the above described way, so that fluorescent proteins 16 are connected and fixed at the interface between their surfaces and the polymer matrix 20. FIG. 6 shows the sample in a fluorescence microscope, so that the randomly dispersed fibers 18 within the polymer matrix 20 are well recognizable by the fluorescence of the proteins at their surfaces.

Figure 7A:
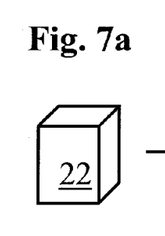
FIGS. 7a to 7d widening and spreading of small damages in a polymer material until break down.
Figure 7B:
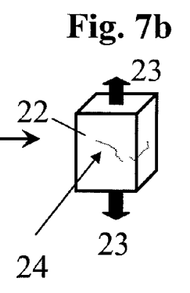
Figure 7C:
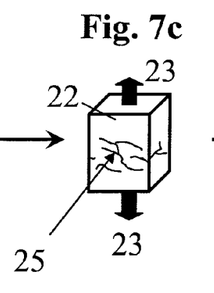
Figure 7D:
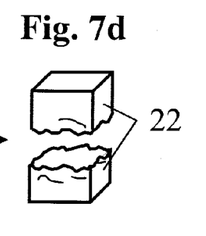

FIG. 7a shows a block shaped sample of a synthetic material 22 in its originally state without exposure to any impacts. FIG. 7b shows the formation of submicro-cracks 24 under a tension force 23. FIG. 7c shows widening and spreading 25 of those cracks under the tension force 23. FIG. 7d shows the structural failure of the polymer material 22.

Figure 8A:
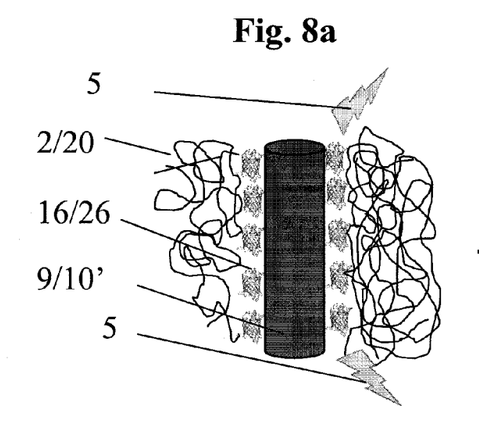
FIGS. 8a, 8b simplified model of the inventive synthetic material and its functionality.
Figure 8B:
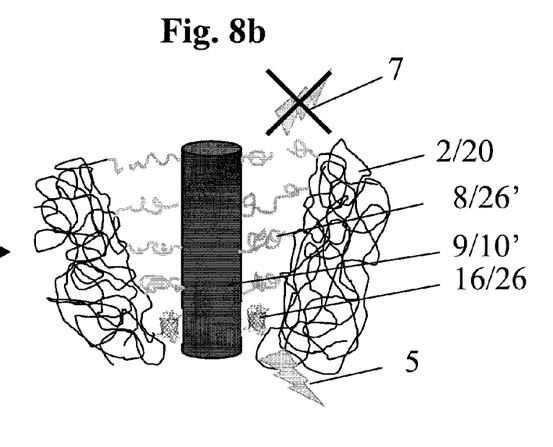

FIG. 8a shows a simplified model of a glass fiber 10' in a polymer matrix 20 having fluorescent proteins 16 as an optical detectable component 26 with intact structure at the interface between polymer matrix 20 as a first phase 2 and glass fibers 10' as a second phase 9. As indicated by symbol 5 the proteins 26/16 with intact structure show fluorescence. As a result of a microscopic delamination process, indicated by reaction arrow 1, one portion of the proteins is perturbed in its structure or even broken, which is indicated by indices 8/26' in FIG. 8b. Those proteins 8/26' lost their fluorescence, which is indicated by symbol 7.

Figure 9:
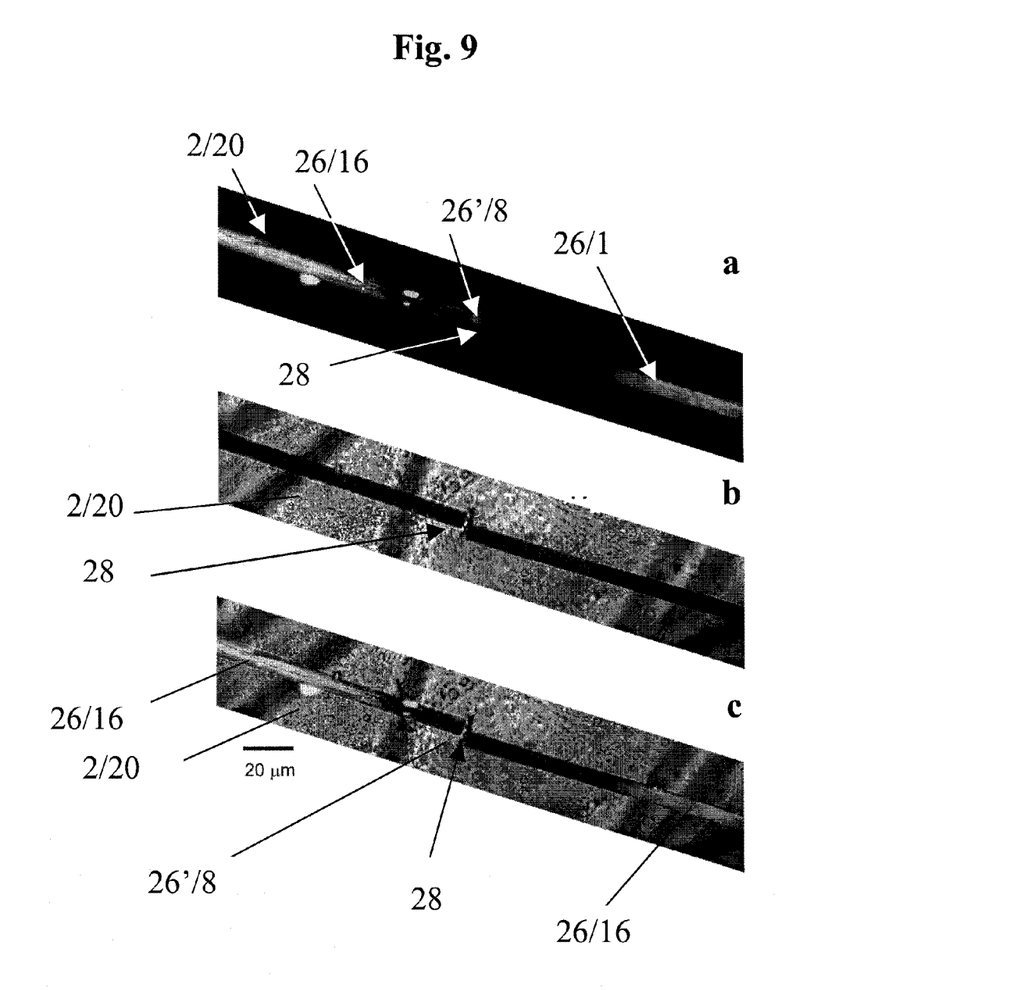
FIG. 9 an example of an experimental determination of a broken fiber within a synthetic material according to the invention, showing the broken fiber and a delamination around the breaking point of the broken fiber.

In FIG. 9a to 9c an example of a broken fiber 28 within a synthetic material 22 according to the invention and its detectability is shown. FIG. 9a shows the image of the broken fiber 28 in the spotlight of a fluorescence microscope. FIG. 9b shows the image of the same broken fiber 28 created by a transmission microscope. FIG. 9c shows the result of an overlay of both images. It can easily be seen that in the area of the broken part of the broken fiber 28, the bonding between the fiber and the polymer matrix 2 occupied by the optical detectable component 26 "fluorescent protein" 16 has been exposed to an impact that perturbed or disturbed the structure of the protein 16 so heavily that the fluorescence of the proteins is no longer detectable.

In the following distinct embodiments are described in detail:

In a first embodiment the fluorescent proteins will be covalently immobilized onto the surface of carbon fibers. About 200 mg of carbon fibers were cleaned with acetone (P.A.) in an ultrasonic bath at room temperature for 3 h. The fibers were dried by heating in a vacuum oven at 50° C. for 30 min. The fiber surface was oxidized by heating the carbon fibers in approx. 50 ml concentrated nitric acid (65%) at 110° C. for 2 h. This process generates carboxylic acid functional groups, next to others, on the surface. Then, the fibers were thoroughly washed with water and stored in water until further use.

Enhanced yellow fluorescent protein (eYFP), or enhanced cyan fluorescent protein (eCFP) was immobilized on the fibers' surface via NHS-ester activated amidation. To this end, 35 mg carbon fibers were reacted with 1-ethyl-3-(3-dimethylaminopropyl)-carbodiimid (EDAC, 155 mg, 0.809 mmol) and N-hydroxysuccinimide (NHS, 245 mg, 2.13 mmol) in 15 ml of 100 mM 2-(N-morpholino)ethanesulfonic acid (MES) buffer (pH 6.0, 500 mM NaCl), under sonication for 2 hours. Excess EDAC was optionally quenched by the addition of mercaptoethanol (21 µl, 0.30 mmol). The fibers were rinsed thoroughly with water and dried in a vacuum oven at 50° C. for 1.5 h and stored in a dry place.

About 5 mg of these fibers were added to 1.0 ml solution of fluorescent protein (approx. 0.2 mg/ml) in 100 mM sodium phosphate buffer (pH 7.5) and sonicated at 20° C. for 2 h. Optionally, agents for the enhancement of protein stability or for further surface-modification of the fibers, like poly(ethylene glycol), EDTA, ethylene glycol, bovine serum albumin, hydroxylamine, TRIS, poly-L-lysine, and Brij 35 were added during or after the immobilization with fluorescent proteins. The modified fibers were washed with approx. 10 ml 100 mM sodium phosphate buffer (pH 7.5), and used either without drying, or blotted dry with laboratory tissue and air-dried for 5 h at room temperature.

In a further embodiment homobifunctional crosslinkers such as disuccinimidyl terephthalate (DST) or ethylene glycol bis(succinimidylsuccinate) (EGS) were used to immobilize fluorescent proteins on carbon fiber surface. To this end, the carboxylic acids on the carbon fibers were first transformed into amino functions. To this end, 35 mg oxidized carbon fibers were reacted with 1-ethyl-3-(3-dimethylaminopropyl) carbodiimid (EDAC, 155 mg, 0.809 mmol) and ethylenediamine dihydrochloride (2.00 g, 15.0 mmol) in 15 ml of 100 mM 2-(N-morpholino)ethanesulfonic acid (MES) buffer (pH 6.0, 500 mM NaCl), under soniction for 2 hours. Alternatively, freshly distilled ethylenediamine (1.0 ml, 15.0 mmol) was used and after dissolution the pH of the buffer was adjusted to 6.0 using concentrated HCl. Excess EDAC was optionally quenched by the addition of mercaptoethanol (21 µl, 0.30 mmol). The fibers were rinsed thoroughly with water and dried in a vacuum oven at 50° C. for 30 minutes h and stored in a dry place.

About 5 mg of the dried carbon fibers were added to solutions of the linkers DST or EGS in N,N-dimethylformamide (10 mg, 28 µmol DST in 1.5 ml DMF or 10 mg, 22 µmol EGS in 1.0 ml DMF) and sonicated at 20° C. for 2 hours. The fibers were washed with approx. 5 ml N,N-Dimethylformamide and dried in a vacuum oven at 50° C. for 1.5 h and stored in a dry place. Afterwards, the fibers were added to 1.0 ml solution of fluorescent protein (approx. 0.2 mg/ml) in 100 mM sodium phosphate buffer (pH 7.5) and sonicated at 20° C. for 2 h. The modified fibers were washed with approx. 10 ml 100 mM sodium phosphate buffer (pH 7.5), and used either without drying, or blotted dry with laboratory tissue and air-dried for 5 h at room temperature.

In another embodiment the immobilization procedures described above where adopted to glass fibers, wherein the glass fiber's surface will be modified with (3-aminopropyl)-triethoxysilane, and activated with amine crosslinkers such as glutaraldehyde. Then, proteins can be conjugated to the surface.

For all embodiments the immobilization protocol can be optimized to achieve a homogeneous coverage of the fibers with protein. Thus, i.e. other conjugation linkers that introduce a flexible spacer can be used to immobilize proteins on the fibers. Further the number of attachment points between the protein and fiber can be controlled by targeting different functional groups on the protein's surface. Cystein-residues can be easily introduced into the protein by site-directed point mutagenesis. Then, heterobifunctional linkers that react with amine groups on the fiber and with sulfhydryl groups on the protein can be used to conjugate the protein to the fiber. An example for such a linker is maleimidobenzoyl-N-hydroxysuccinimide.

In a next embodiment the fibers resulting from the procedures described above are placed into a curing mixture of a two component epoxy resin. Epoxy-type resins are one of the most widespread used polymer matrices for the production of fiber-reinforced composite materials. Moreover, most of these resins are transparent and nearly colourless, a property which renders them ideal to observe fluorescence in their bulk. Therefore, the protein-modified fibers will be embedded into such a resin. Upon curing, epoxy groups of the monomers will react with lysine groups on the surface of the proteins, thus forming covalent links between the polymer network and the proteins. The resulting composite materials can be achieved by curing the mixture in an according mould, by the pre-preg method, or creating an according shape by an extrusion process. Further the synthetic material can be subjected to several forms of mechanical treatment in order to get its final shape and surface quality.

In another embodiment said fibers are immersed in a commercially available two-component epoxy system that consists of a liquid epoxy prepolymer and a liquid hardener containing multifunctional amine components and cures at room temperature. Upon curing, the epoxy groups of the prepolymer react with the amino groups of the hardener, creating a highly crosslinked polymer network. The epoxy groups will also react with any amine or hydroxyl group present at the proteins surface, thus creating multiple covalent bonds between the protein and the polymer.

Although the chemistry of the immobilization of proteins is well known, the immobilization can be optimized and fine-tuned in order to generate an even, homogeneous layer of protein on the reinforcing material. Such a homogeneous coverage is essential to easily determine the location of a small-scale damage in the composite material by the absence of fluorescence. The immobilization protocols can be fine-tuned, e.g., by adjusting the pH, the temperature, the concentration of reagents and by controlling the stirring. Immobilization of fluorophores on a surface can lead to quenching of fluorescence. However, as the fluorophore of fluorescent proteins is well-enclosed inside the protein's barrel-like structure, the fluorophore is spaced from the surface, thus reducing the probability of quenching effects. Immobilization on glass or carbon surfaces might lead to a different amount of quenching. Therefore, the effect of the nature of the fiber on the fluorescence of the protein can be different in dependence of the bonding partner.

In order to survey the quality of the synthetic material surface modification and immobilization efficiency can be assessed by fluorescence microscopy, by analyzing the fiber's surface with environmental scanning electron microscopy, with atomic force microscopy, with contact angle measurements, with surface tension measurements, with X-ray photo electron spectroscopy, with UV/Vis spectroscopy, and with ellipsometry. Moreover, the fibers wetability with the liquid epoxy system will be analyzed by contact angle measurements.

The use of the synthetic material as a damage self-reporting material particularly in the areas of aeronautics, aerospace, automotive, wind turbines and sporting goods is very advantageous; particularly as a construction material and/or a high performing material. This is because the optical detectable component can be adjusted to the distinct requirements and can make visible perturbations and damages already in a nano-scale dimension before they can cause catastrophic failures of a product.

This is because the optical detectable components are sensitive to impacts higher than the forces needed to disturb the connection between the two phases in the synthetic material. For example Green Fluorescent Protein (GEF) looses its fluorescence after an impact higher than 35 pN. Taken in consideration the cylindrical dimension of the protein a projection area of the protein of about 5 nm2 to 10 nm2 respectively results, depending on the alignment of the protein (vertical or horizontal). The lap shear strength of an araldite resin, i.e. Araldite Cristal® is about 4 MPa up to 10 MPa that means 4-10 pN/nm2. The single pullout strength in a carbon fiber composite is about 76-150 MP or 76-150 pN/nm2. The single pullout strength is the force needed to pull out a single carbon fiber out of its polymer matrix.

As stated before the force needed to unfold green fluorescent protein has been determined by single molecule force spectroscopy to be 35 pN. The many known fluorescent GFP analogs may already exhibit different mechanical stability. The most commonly used fluorescent proteins, eYFP, eCFP and native GFP, will be used as molecular force sensor on the interface between at least two phases in the synthetic material in order to analyze differences in their sensitivity as mechanophores with respect to the applied forces. Furthermore, the influence of the number of attachment points to the fiber, the length and chemical composition of the conjugation linker between fiber and protein, and the influence of the phase material on the force needed to change the optical properties and particularly to switch off fluorescence has to be considered when crating a synthetic material for a distinct purpose and especially when creating a sensor comprising the synthetic material. The result is a material that reliably reports small scale delamination damage with a high sensitivity.

In general it can be stated that the smart synthetic material described herein can be a means to avoid accidents due to catastrophic failure of a material. Such properties are highly desirable for load-bearing components in construction, aircraft, and automotive applications. A specific need is the detection of barely visible damage caused by the impact of falling objects, such as dropped tools during manufacturing, assembly or maintenance work. This damage manifests itself in a local delamination of the matrix from the reinforcing material, which is barely observable by visual inspection. With the system, described herein such damaged areas would stop to be optical detectable. Particularly it would stop to be fluorescent, which could be observed by illuminating the component with black light. Therefore, the herein described enhanced composites represent a simple, easy to use damage detection system. Moreover, it is possible to detect delamination defects on the nano-scale, because the optical detectable components sense the destructive forces on the molecular level. Such a detection of nanometer-sized gaps between the reinforcing material and the matrix is not possible with conventional damage-detecting techniques.

The invention claimed is:

1. A synthetic material (22) comprising at least two phases and an optical detectable component, wherein a first phase (2) building a matrix (20) of the synthetic material (22) and a second phase (9) of said at least two phases are a solid phase and wherein said optical detectable component is placed at an interface of the first phase (2) and the second phase (9) and is bonded to the first phase (2) and the second phase (9);

wherein the optical detectable component comprises at least one fluorescent component which changes its fluorescence when its structure is perturbed; and     wherein the fluorescent component is a fluorescent protein (16).

2. A synthetic material (22) comprising at least two phases and an optical detectable component, wherein a first phase (2) building a matrix (20) of the synthetic material (22) and a second phase (9) of said at least two phases are a solid phase and wherein said optical detectable component is placed at an interface of the first phase (2) and the second phase (9) and is bonded to the first phase (2) and the second phase (9);
    wherein the optical detectable component comprises at least one fluorescent component which changes its fluorescence when its structure is perturbed; and
    wherein the optical detectable component is a mixture of various kinds of fluorescent proteins (16) with different fluorescence frequencies which change their fluorescence at different impact forces.

3. The synthetic material (22) according to claim 1, wherein the bonding of the optical detectable component to both phases (2, 9) is realized in a way that forces induced by a movement of the two phases (2, 9) against each other or introduced between the two phases (2, 9) are transferred to the optical detectable component.

4. The synthetic material (22) according to claim 3, wherein the bonding is realized by physical interactions or by chemical interactions.

5. The synthetic material (22) according to claim 1, wherein the second phase (9) is dispersed in the first phase (2).

6. The synthetic material (22) according to claim 1, wherein the second phase (9) is a reinforcing material (10) of a fiber structure and/or of particle structure.

7. The synthetic material (22) according to claim 1, wherein the matrix material (20) of the first phase (2) is a polymeric material.

8. A sensor comprising the synthetic material (22) according to claim 1 for detecting impact forces and/or strains and/or damages by a change of the optical properties of the optical detectable component.

9. A method for making a synthetic material according to claim 1, wherein an optical detectable component is placed and fixed at an interface between the two phases (2, 9) of the synthetic material.

10. The method according to claim 9, comprising the steps of:
    a. immobilizing the optical detectable component onto a surface of fibers, particles, molecules or atoms respectively of a material forming one of the at least two phases (2, 9) of the synthetic material;
    b. choosing a material forming the other phase of the at least two phases (2, 9) of the synthetic material (22), which is responsive to a bonding to the optical detectable component or preparing the material forming the other phase of the at least two phases (2, 9) of the synthetic material (22), thus it can be bond to the optical component;
    c. mixing the at least two materials; and
    d. curing the mixture to form the synthetic material (22).

11. A method for making the sensor according to claim 8, comprising the steps of:
    a. determining at least one amount of an impact force, a strain, a mechanical deformation, a compression, an extension, a bending, a fiber-breaking, a delamination, a matrix-cracking which should be detectable;
    b. choosing or creating an according optical detectable component which changes its optical properties by an impact force, strain, mechanical deformation, compression, extension, bending, fiber-breaking, delamination, matrix-cracking of the determined amount or higher amount; and
    c. placing the optical detectable component at an interface between two phases (2, 9) in a synthetic material (22) having at least two phases.

* * * * *